No. 703,860. Patented July 1, 1902.
P. I. VIEL.
EXPANSIBLE PULLEY FOR MOTOR VEHICLES.
(Application filed Apr. 10, 1901.)
(No Model.) 3 Sheets—Sheet 1.

WITNESSES:
W. M. Avery
C. E. Holske

INVENTOR
Paul I. Viel
BY
ATTORNEYS

No. 703,860. Patented July 1, 1902.
P. I. VIEL.
EXPANSIBLE PULLEY FOR MOTOR VEHICLES.
(Application filed Apr. 10, 1901.)
(No Model.) 3 Sheets—Sheet 2.

WITNESSES:
W. M. Avery
C. E. Holske

INVENTOR
Paul I. Viel
BY
ATTORNEYS

No. 703,860. Patented July 1, 1902.
P. I. VIEL.
EXPANSIBLE PULLEY FOR MOTOR VEHICLES.
(Application filed Apr. 10, 1901.)
(No Model.) 3 Sheets—Sheet 3.

WITNESSES
W. M. Avery
C. E. Holske

INVENTOR
Paul I. Viel
BY
Munn
ATTORNEYS

UNITED STATES PATENT OFFICE.

PAUL ISIDORE VIEL, OF PARIS, FRANCE.

EXPANSIBLE PULLEY FOR MOTOR-VEHICLES.

SPECIFICATION forming part of Letters Patent No. 703,860, dated July 1, 1902.

Application filed April 10, 1901. Serial No. 55,157. (No model.)

*To all whom it may concern:*

Be it known that I, PAUL ISIDORE VIEL, salesman, a citizen of the French Republic, and a resident of 99 Rue de la Verrerie, in the city of Paris, Republic of France, have invented Improvements Relating to Expansible Pulleys for Motor-Vehicles, of which the following is a full, clear, and exact description.

This invention relates to transmission and speed gear for motor-vehicles and is characterized by extensible pulleys which enable the ratio of the diameters between the driving and the driven pulleys to be altered in such a manner as to alter the speed of the driven shaft in the same ratio. Furthermore, the extensible pulley permits of instantly stopping the driving-belt. This transmitting and speed gear is more especially intended for use in connection with motor-vehicles for coupling the driving-shaft with the driven axle; but I may also apply the same to other mechanical arrangements.

In order that my invention may be clearly understood, I will refer to the accompanying drawings, in which—

Figure 1:
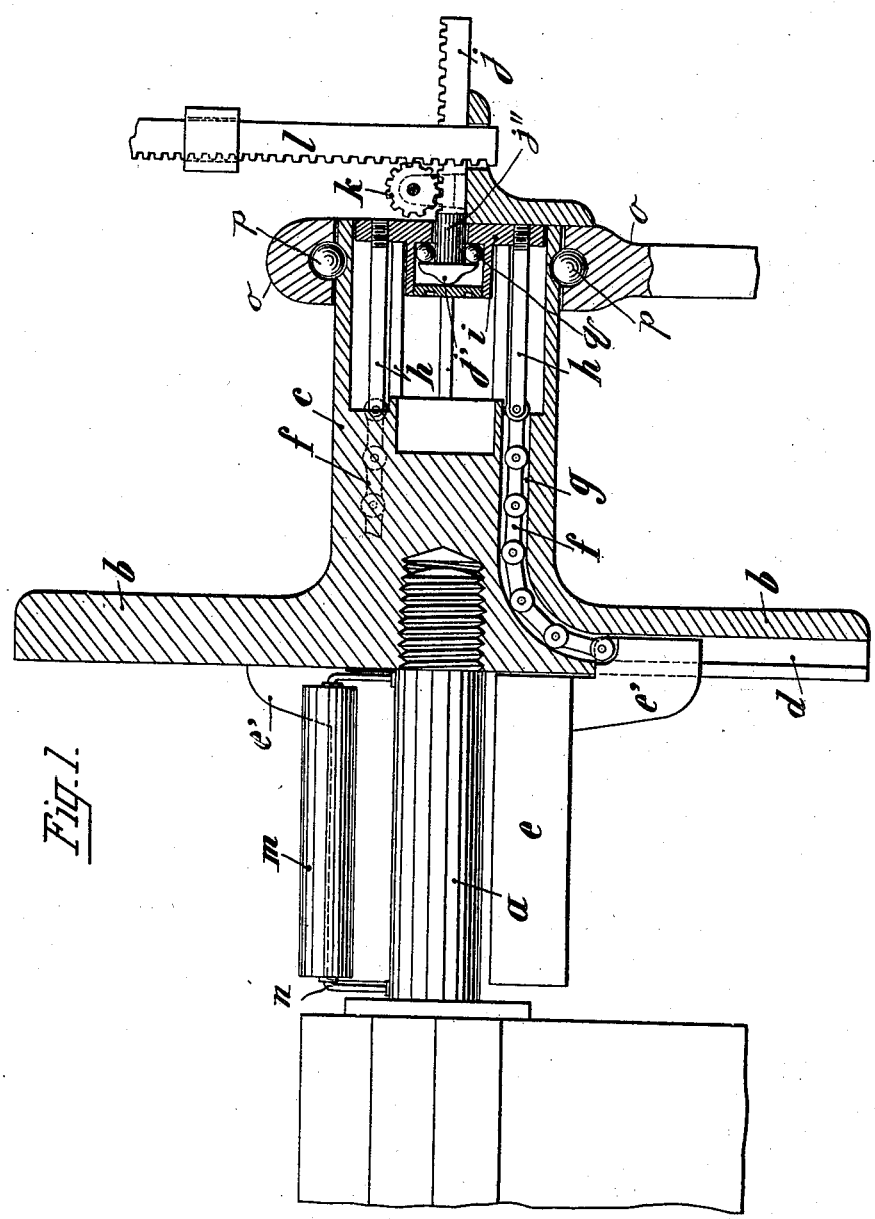
Figure 2:
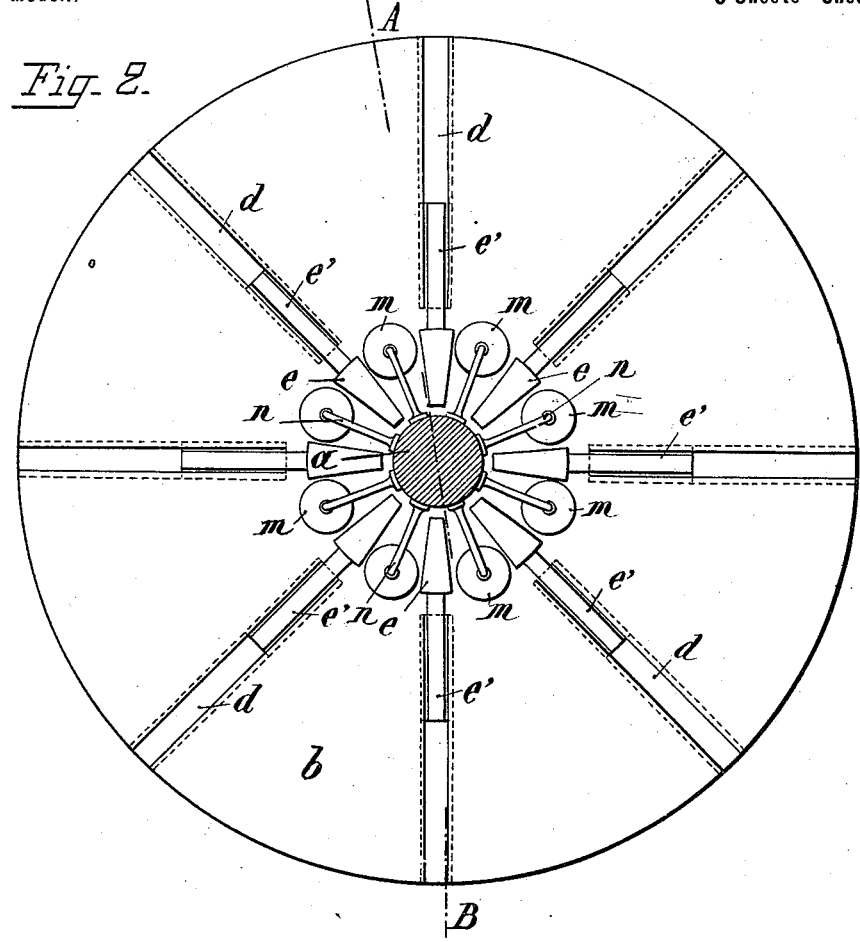
Figure 4:
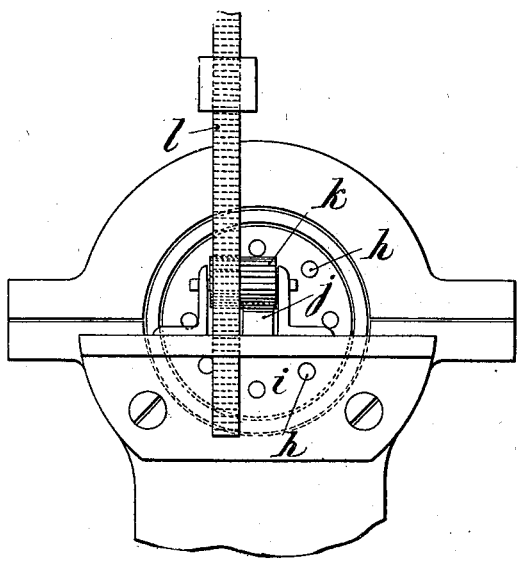
Figure 3:
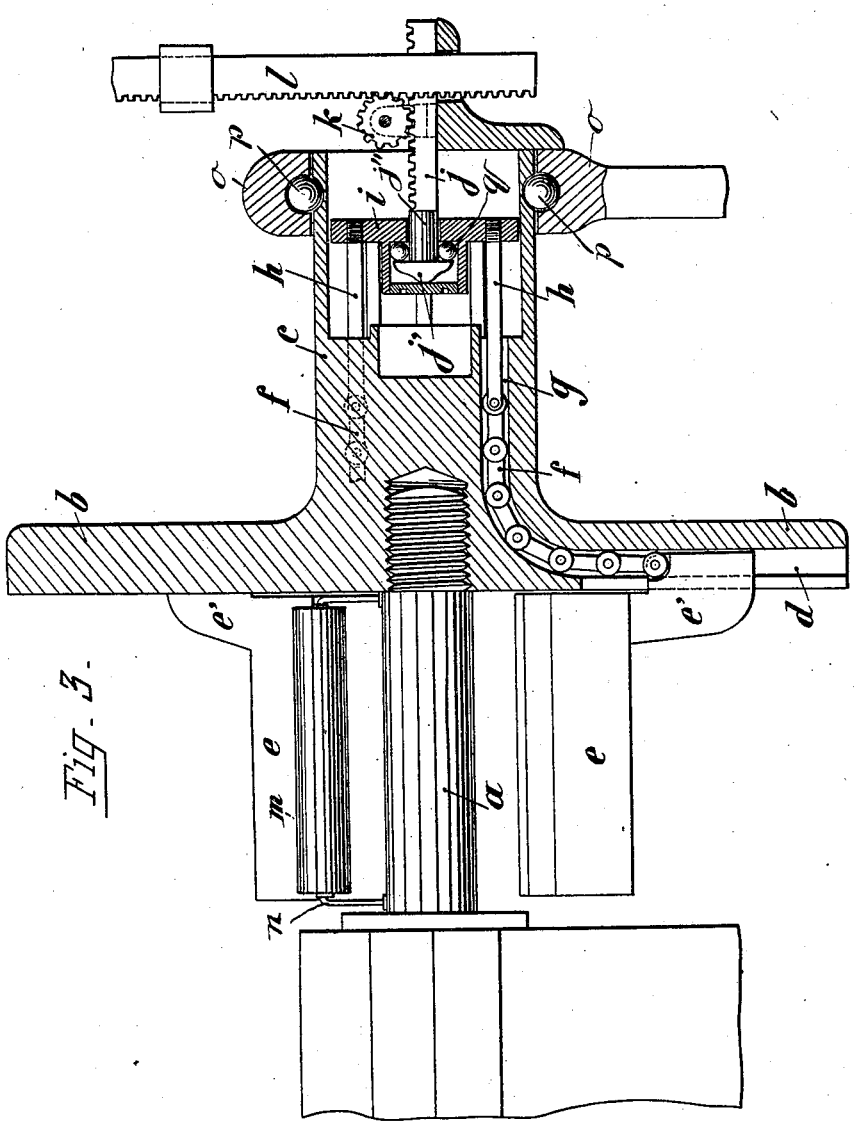

Figure 1 is a vertical longitudinal section of my transmission and speed gear, taken on the line A B of Fig. 2. Fig. 2 is an end elevation of the same. Fig. 3 is a vertical longitudinal section of the same, showing the pulley in expanded position; and Fig. 4 is a a detail end view, the view being taken from the right of Fig. 1.

In all the figures the same letters of reference designate similar parts.

The motor-shaft $a$ is fitted with a disk $b$, formed with a kind of hub $c$, mounted to turn in a suitable bearing or support $o$, provided with balls $p$. The said disk $b$ is formed with radial grooves $d$, in which are movable slides $e'$, connected with sectors $e$, on which is mounted the transmission-belt and which constitute my extensible pulley. Each of the sectors $e$ is connected with a chain $f$, capable of moving in a groove $g$, provided in the hub $c$. Each of the chains is furnished with a rod $h$, and these latter are connected to a kind of piston $i$, operated by a rack $j$, actuated by a pinion $k$, which itself is driven by a rack $l$, the pinion $k$ and racks $j$ and $l$ being suitably supported, as shown in the drawings. The piston $i$ is adapted to roll over the rack $j$, which is provided with a cylindrical portion $j''$ and terminates in a head $j'$, balls $q$ being interposed between the inner wall of the piston and the cylindrical portion of the rack. Between the sectors $e$ are placed rollers $m$, which revolve in supports $n$. By operating the rack $l$ in one or other direction it revolves the pinion $k$, which through the intervention of the rack $j$ moves the piston $i$ in or out. The said piston in turn actuates the rods $h$ and chains $f$ in such a manner as to cause the sectors $e$ to approach the shaft $a$ more or less, which latter forms the axis of the mechanical arrangement. If the belt passes over the sectors $e$ when farthest away from the center, it will be easy to understand that thus a large pulley is formed and that the belt will move faster than when all of the sectors are nearest the center. In Fig. 1 the piston $i$ is shown in its outermost position, the pulley being contracted, and in Fig. 3 the piston is shown as moved inward, the pulley being expanded. By approaching the sectors toward the center of the motor-shaft $a$ there will arrive a moment when the belt comes to repose entirely upon the rollers $m$ and then the belt will be stopped. In order to have the belt always tightly stretched, any desired means may be utilized.

The form, details, accessories, materials, and dimensions of these parts as hereinbefore described may be modified without altering the nature of my invention.

I claim—

1. A transmitting and speed gear, comprising the motor-shaft $a$, the disk $b$ carried by said shaft, and having grooves $d$ formed therein, the sectors $e$ adapted to slide within the said grooves, said sectors being arranged to receive a transmission-belt coupling the driving-shaft to the driven one in order to vary the speed of the latter, chains $f$ connected with said sectors, rods $h$ connected with the chains, supports $n$ carried by the shaft, rollers $m$ mounted to revolve on said supports between the sectors and adapted to receive the belt when the sectors are retracted, and a shifting device for the sectors connected with the said rods.

2. An expanding pulley, comprising a rotatable body, belt-engaging portions slidable in and out on said body, means for adjusting said belt-engaging portions, and rollers carried by said body between the belt-engaging portions and adapted to hold the belt out of driving engagement with the pulley when said slidable belt-engaging portions are retracted.

3. An expanding pulley, comprising a rotatable body, belt-engaging slides movable in and out on said body, the latter being provided with curved channels, a follower or piston movable lengthwise of the pulley's axis of rotation, means for adjusting said follower, and chains each connected at one end with said follower, and at the other end with one of the belt-engaging slides, said chains moving in said curved channels.

4. In an expansible pulley, the combination with the rotatable body, of the belt-engaging slides, movable in and out on said body, means for holding the belt out of driving engagement with the body when said slides are retracted, the follower or piston, connections between said follower and the belt-engaging slides, a rack connected with the piston, a pinion for moving the rack, and a second rack for rotating the pinion.

5. In an expansible pulley, the combination with the rotatable body, of the belt-engaging portions, movable in and out on said body, chains connected with the belt-engaging portions and extending in channels formed in the body, rods connected with the said chains, and means connected with the said rods for adjusting the belt-engaging portions.

The foregoing specification of my improvements relating to expansible pulleys for motor-vehicles signed by me this 23d day of March, 1901.

PAUL ISIDORE VIEL.

Witnesses:
 EDWARD P. MACLEAN,
 MAURICE H. PIGNET.